(12) United States Patent
Eguchi et al.

(10) Patent No.: US 11,219,930 B2
(45) Date of Patent: Jan. 11, 2022

(54) FILTER CLEANING METHOD AND FILTER CLEANING APPARATUS

(71) Applicants: NAGASE FILTER CO., LTD., Higashiosaka (JP); NATIONAL UNIVERSITY CORPORATION KUMAMOTO UNIVERSITY, Kumamoto (JP)

(72) Inventors: Toshiki Eguchi, Osaka (JP); Masayoshi Shimo, Osaka (JP); Hideki Hayashi, Osaka (JP); Kazuyuki Hokamoto, Kumamoto (JP); Shigeru Tanaka, Kumamoto (JP)

(73) Assignees: Nagase Filter Co, Ltd., Osaka (JP); National University Corporation Kumamoto University, Kumamoto (JP)

( * ) Notice: Subject to any disclaimer, the term of this patent is extended or adjusted under 35 U.S.C. 154(b) by 0 days.

(21) Appl. No.: 16/648,135

(22) PCT Filed: Dec. 12, 2018

(86) PCT No.: PCT/JP2018/045663
§ 371 (c)(1),
(2) Date: Mar. 17, 2020

(87) PCT Pub. No.: WO2019/230024
PCT Pub. Date: Dec. 5, 2019

(65) Prior Publication Data
US 2020/0215586 A1    Jul. 9, 2020

(30) Foreign Application Priority Data

May 28, 2018    (JP) .............................. JP2018-101606

(51) Int. Cl.
*B08B 3/12* (2006.01)
*B01D 41/04* (2006.01)
(Continued)

(52) U.S. Cl.
CPC ................ *B08B 3/12* (2013.01); *B01D 41/04* (2013.01); *B01D 2323/21* (2013.01); *B08B 7/02* (2013.01);
(Continued)

(58) Field of Classification Search
CPC combination set(s) only.
See application file for complete search history.

(56) References Cited

U.S. PATENT DOCUMENTS

| 3,429,743 A | 2/1969 | Branson |
| 6,058,945 A | 5/2000 | Fujiyama et al. |

(Continued)

FOREIGN PATENT DOCUMENTS

| JP | 46-43758 | 12/1971 |
| JP | 7-000572 | 1/1995 |

(Continued)

OTHER PUBLICATIONS

U.S. Appl. No. 16/335,618, filed Mar. 21, 2019.
(Continued)

*Primary Examiner* — Erin F Bergner
(74) *Attorney, Agent, or Firm* — Hamre, Schumann, Mueller & Larson, P.C.

(57) ABSTRACT

The present invention provides a new filter cleaning method that has cleaning performance superior to that of ultrasonic cleaning. The method for cleaning a filter of the present invention includes the steps of: generating a shock wave; and bringing the shock wave into contact with a filter to which a filler adhered, wherein in the shock wave contacting step, a pressure applied to the filter by the shock wave is 0.07 MPa or more.

3 Claims, 1 Drawing Sheet

(51) Int. Cl.
*B08B 7/02* (2006.01)
*B08B 13/00* (2006.01)

(52) U.S. Cl.
CPC ....... *B08B 13/00* (2013.01); *B08B 2203/0288* (2013.01)

(56) References Cited

U.S. PATENT DOCUMENTS

| | | | |
|---|---|---|---|
| 6,755,821 B1* | 6/2004 | Fry ................ | A61N 7/00 604/20 |
| 2003/0015227 A1 | 1/2003 | Takayama et al. | |
| 2004/0256952 A1 | 12/2004 | Puskas | |
| 2007/0051390 A1* | 3/2007 | Norris ............ | B08B 7/0071 134/42 |
| 2011/0135534 A1* | 6/2011 | Bates ............. | B08B 9/0804 422/20 |
| 2013/0152518 A1* | 6/2013 | Korenev ........ | F01N 3/0275 55/283 |
| 2014/0053868 A1 | 2/2014 | Rastegar et al. | |
| 2015/0375274 A1 | 12/2015 | Flury et al. | |
| 2017/0036253 A1* | 2/2017 | Lukac ............ | B08B 3/102 |
| 2017/0151534 A1 | 6/2017 | Fukuda et al. | |
| 2019/0299257 A1 | 10/2019 | Eguchi | |

FOREIGN PATENT DOCUMENTS

| | | |
|---|---|---|
| JP | 2000-042503 | 2/2000 |
| JP | 2003-033735 | 2/2003 |
| JP | 2004-202454 | 7/2004 |
| JP | 2004-358286 | 12/2004 |
| JP | 2006-150493 | 6/2006 |
| JP | 2008-200634 | 9/2008 |
| JP | 2008-238152 | 10/2008 |
| JP | 2010-062660 | 3/2010 |
| JP | 2014-076440 | 5/2014 |
| JP | 2015-013240 | 1/2015 |
| JP | 2016-064344 | 4/2016 |
| KR | 10-2016-0042806 | 4/2016 |
| TW | 201235118 | 9/2012 |
| TW | 201817504 | 5/2018 |
| TW | 201831237 | 9/2018 |
| WO | 95/23766 | 9/1995 |
| WO | 2015/198948 | 12/2015 |
| WO | 2017/042630 | 3/2017 |
| WO | 2018/078926 | 5/2018 |

OTHER PUBLICATIONS

Extended European Search Report issued in the related European patent application (No. 17864847.3) dated Aug. 11, 2020, 10 pages.
Office Action issued in the related Korean patent application (No. 10-2019-7007478) dated Feb. 28, 2020, 10 pages with a machine translation.
Office Action issued in the corresponding Taiwanese patent application (No. 108107256) dated Nov. 13, 2019 with a partial translation.
Office Action issued in the related Japanese patent application (No. 2018-530927) dated Jul. 10, 2018 with a machine translation.
Final Office Action issued in the related Japanese patent application (No. 2018-530927) dated Oct. 23, 2018 with a machine translation.
Office Action issued in the related Japanese patent application (No. 2019-516265) dated Jun. 27, 2019 with a machine translation.
Final Office Action issued in the related Japanese patent application (No. 2019-516265) dated Sep. 10, 2019 with a machine translation.
Office Action issued in the related Taiwanese patent application (No. 108107062) dated Aug. 27, 2019 with a machine translation.
International Search Report issued in International Application No. PCT/JP2018/045663, dated Jan. 15, 2019, 4 pages.
Final Office Action issued in the related U.S. Appl. No. 16/335,618 dated Oct. 8, 2020, 18 pages.
Office Action issued in the related Korean patent application No. 10-2019-7007478 dated Oct. 15, 2020, 10 pages w/translation.
Office Action issued in co-pending U.S. Appl. No. 16/335,618, dated Mar. 30, 2020, 11 pages.
Office Action issued in co-pending U.S. Appl. No. 16/335,618, dated Jun. 10, 2021, 20 pages.
Extended European Search Report issued in corresponding European Patent Application No. 18920940.6, dated May 20, 2021, 7 pages.

* cited by examiner

FILTER CLEANING METHOD AND FILTER CLEANING APPARATUS

TECHNICAL FIELD

The present invention relates to a filter cleaning method and a filter cleaning apparatus.

BACKGROUND ART

Conventionally, ultrasonic cleaning has been used for cleaning filters (see Patent Literature 1).

CITATION LIST

Patent Literatures

Patent Literature 1: JP 2004-358286 A

SUMMARY OF INVENTION

Technical Problem

However, ultrasonic cleaning sometimes cannot physically remove deposits such as fillers adhered to the filter.

With the foregoing in mind, it is an object of the present invention to provide a new filter cleaning method and filter cleaning apparatus that have cleaning performance superior to that of ultrasonic cleaning.

Solution to Problem

In order to achieve the above object, the present invention provides a method for cleaning a filter, including the steps of: generating a shock wave; and bringing the shock wave into contact with a filter to which a filler adhered, wherein in the shock wave contacting step, a pressure applied to the filter by the shock wave is 0.07 MPa or more.

The present invention also provides a filter cleaning apparatus for removing a filler used in the filter cleaning method according to the present invention, including: a shock wave generating unit for generating a shock wave; and a filter housing provided adjacent to the shock wave generating unit or accommodating the shock wave generating unit therein, and that can house a filter to which a filler adhered, wherein a pressure applied to the filter by the shock wave is 0.07 MPa or more.

Advantageous Effects of Invention

According to the filter cleaning method and filter cleaning apparatus of the present invention, cleaning performance superior to that of ultrasonic cleaning can be obtained.

DESCRIPTION OF EMBODIMENTS

In the present invention, the "shock wave" is, for example, a wave of pressure change that travels at a speed exceeding the sonic speed. In the present invention, there is no particular limitation on a shock wave generator and a shock wave generating method. For example, the shock wave generator may be a pair of electrodes, and the shock wave may be generated by electrical discharge such as pulse discharge using the electrodes, or the shock wave generator may be an explosive such as gunpowder, and the shock wave may be generated by explosion.

In the present invention, the "pressure" may be, for example, a gauge pressure.

In the filter cleaning method of the present invention, in the shock wave contacting step, the shock wave may be brought into contact with the filter under water. In the filter cleaning apparatus of the present invention, the filter housing may be filled with water, and the shock wave may be brought into contact with the filter under water.

In the filter cleaning method and filter cleaning apparatus of the present invention, the filler may be at least one selected from the group consisting of titanium oxide, calcium carbonate, talc, silica, montmorillonite, sepiolite, clay, wollastonite, potassium titanate, zonotolite, gypsum fibers, aluminum borate, fibrous magnesium compounds, aramid fibers, carbon fibers, glass fibers, mica, glass flakes, polyoxybenzoyl whisker, zeolite, silver ion-supported zeolite, silica balloons, glass balloons, shirasu-balloons, resin balloons, carbon black, graphite, metal powder, metal fibers, metal foils, carbon nanotubes, ferrite, magnetic iron oxide, samarium cobalt, Nd—Fe—B, aluminum oxide, aluminum nitride, boron nitride, beryllium oxide, barium titanate, lead zirconate titanate, lead, tungsten, stainless steel, barium sulfate, molybdenum sulfide, charcoal powder, glass beads, magnesium oxide, hydrotalcite, antimony oxide, aluminum hydroxide, magnesium hydroxide, zinc borate, red phosphorus, zinc carbonate, dosonite, zinc oxide, iron oxide, calcium oxide, cerium oxide, activated clay, polymeric gel, pigments, polytetrafluoroethylene powder, and silica gel.

Figure 3:
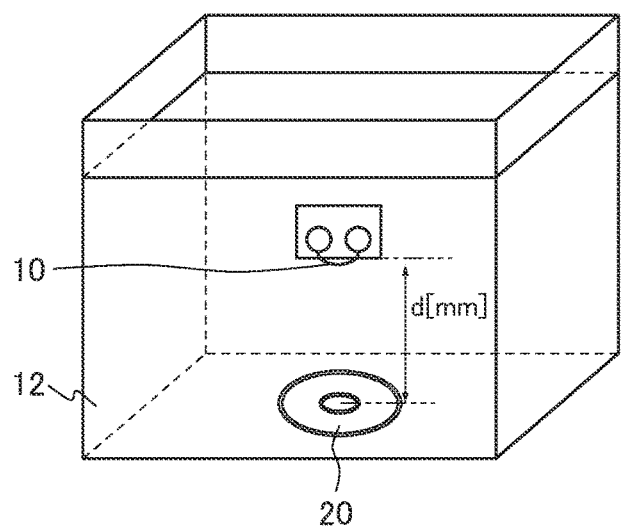
FIG. 3 is a schematic diagram for explaining a cleaning performance evaluation method in Examples of the present invention.

Next, the filter cleaning method and the filter cleaning apparatus of the present invention will be described with reference to illustrative examples. The filter cleaning method of the present invention can be performed, for example, by using the filter cleaning apparatus shown in FIG. 3. As shown in FIG. 3, the filter cleaning apparatus includes a shock wave generating unit 10 and a filter housing 12.

In the filter cleaning apparatus of this example, the filter housing 12 accommodates the shock wave generating unit 10 therein. The shock wave generating unit 10 generates a shock wave by electrical discharge at the time of charging an electrode terminal with an aluminum wire. In this case, the electrical discharge may be performed once, or may be performed a plurality of times in succession. The shock wave generating unit 10 is disposed at a predetermined position by a supporting member (not shown) inside the filter housing 12, for example.

FIG. 3 shows a filter cleaning apparatus in which the filter housing 12 accommodates the shock wave generating unit 10 therein. The present invention, however, is not limited to this example. In the present invention, when the shock wave generating unit 10 generates a shock wave by, for example, the explosive or striking member to be described below, the shock wave generating unit 10 may be provided adjacent to the filter housing 12.

While FIG. 3 shows an electrode terminal with an aluminum wire as the shock wave generator, the present invention is not limited thereto. As described above, in the present invention, there is no particular limitation on the shock wave generator and the shock wave generating method. For example, the shock wave generator may be an explosive such as gunpowder initiated by an electric detonator or the like, and the shock wave may be generated by the explosion of the explosive. Further, for example, the shock wave generator may be a striking member such as a hammer, and the shock wave may be generated by applying a mechanical shock force to the filter housing 12 using the striking member. In these cases, the explosion or strike may be performed once, or may be performed a plurality of times in succession.

The filter housing 12 can house the filter 20. The filter 20 is housed at predetermined position by a supporting member (not shown) inside the filter housing 12, for example. While the number of filters 20 is one in FIG. 3, this is illustrative and the present invention is not limited thereto. In the present invention, the number of filters 20 housed in the filter housing 12 may be more than one.

The material for forming the filter housing 12 is not particularly limited, and examples thereof include resins; and metals such as aluminum, copper, copper alloy, iron, iron alloy, nickel, tungsten, tungsten alloy, and the like.

The filter housing 12 may be filled with a transmission medium for propagating the shock wave. As the transmission medium, for example, a liquid such as water; an elastic body such as rubber; a solid such as a gel-like object; a gas such as air; or a mixture thereof can be used. Among these, liquid or solid is preferable from the viewpoint of the transmitting performance of the shock wave, and water is preferable because it is inexpensive and easily available. When the shock wave generating unit 10 is provided adjacent to the filter housing 12 as described above, the shock wave generating unit 10 may also be filled with the same transmission medium.

The filter cleaning method of the present invention using the filter cleaning apparatus shown in FIG. 3 is performed, for example, as follows. First, a shock wave is generated by the shock wave generating unit 10. The shock wave propagates through the transmission medium (e.g., water) in the filter housing 12 and comes into contact with the filter 20. By the contact of the shock wave with the filter 20, the filler adhered to the filter 20 is crushed and diffused into the transmission medium, thereby removing the filler. At this time, by setting the pressure applied to the filter 20 by the shock wave to 0.07 MPa or more, cleaning performance superior to that of ultrasonic cleaning can be obtained as demonstrated in the examples described below. Examples of the filler include titanium oxide, calcium carbonate, talc, silica, montmorillonite, sepiolite, clay, wollastonite, potassium titanate, zonotolite, gypsum fibers, aluminum borate, fibrous magnesium compounds, aramid fibers, carbon fibers, glass fibers, mica, glass flakes, polyoxybenzoyl whisker, zeolite, silver ion-supported zeolite, silica balloons, glass balloons, shirasu-balloons, resin balloons, carbon black, graphite, metal powder, metal fibers, metal foils, carbon nanotubes, ferrite, magnetic iron oxide, samarium cobalt, Nd—Fe—B, aluminum oxide, aluminum nitride, boron nitride, beryllium oxide, barium titanate, lead zirconate titanate, lead, tungsten, stainless steel, barium sulfate, molybdenum sulfide, charcoal powder, various beads such as glass beads, magnesium oxide, hydrotalcite, antimony oxide, aluminum hydroxide, magnesium hydroxide, zinc borate, red phosphorus, zinc carbonate, dosonite, zinc oxide, iron oxide, calcium oxide, cerium oxide, activated clay, polymeric gel, pigments, polytetrafluoroethylene powder (e.g., Teflon® powder), and silica gel. One of the fillers may be present alone of two or more of them may be present in combination. The transmission medium may be appropriately replaced depending on the degree of contamination due to diffusion of the filler.

EXAMPLES

Next, examples of the present invention will be described together with comparative examples. It is to be noted, however, that the present invention is not limited or restricted by the following examples and comparative examples.

[Relationship Between Distance from Shock Wave Generating Unit and Charge Voltage to Shock Wave Generating Unit and Shock Pressure]

First, prior to the evaluation of the cleaning performance by the filter cleaning method and the filter cleaning apparatus of the present invention, the relationship between the distance from the shock wave generating unit and the charge voltage to the shock wave generating unit and the shock pressure was obtained.

Figure 1:
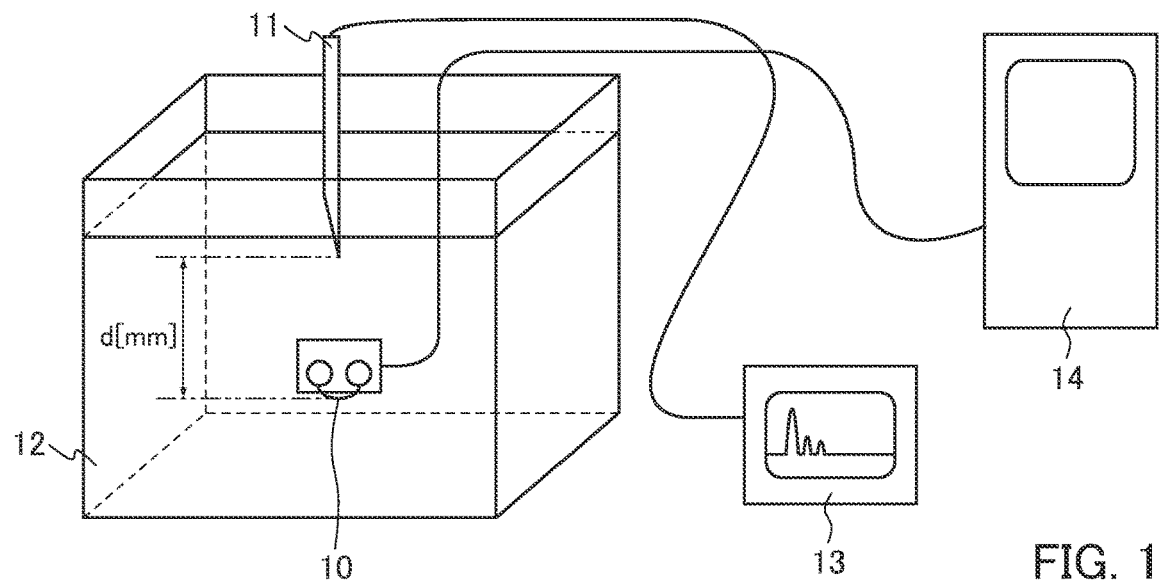
FIG. 1 is a schematic diagram for explaining how to obtain the relationship between the distance from the shock wave generating unit and the charge voltage to the shock wave generating unit and the shock pressure in Examples of the present invention.

As shown in FIG. 1, the pressure was measured by an oscilloscope 13 connected to a pressure probe 11 while changing the distance (d [mm]) between the shock wave generating unit 10 and the pressure probe 11 and the charge voltage to the shock wave generating unit 10 in the filter housing (water tank filled with water) 12. The size of the water tank 12 is not particularly limited, and in this example, a water tank 12 having a rectangular parallelepiped shape of 496 mm×496 mm×598 mm was used. Also, the amount of water to be added to the water tank 12 is not particularly limited, and in this example, the depth was about 520 mm. Further, the configuration of the shock wave generating unit 10 is not particularly limited, and in this example, the shock wave was generated by electrical discharge at the time of charging an electrode terminal with an aluminum wire having a wire diameter of 0.9 mm and a wire length of 60 mm by using a pulse power supply apparatus 14.

Figure 2:
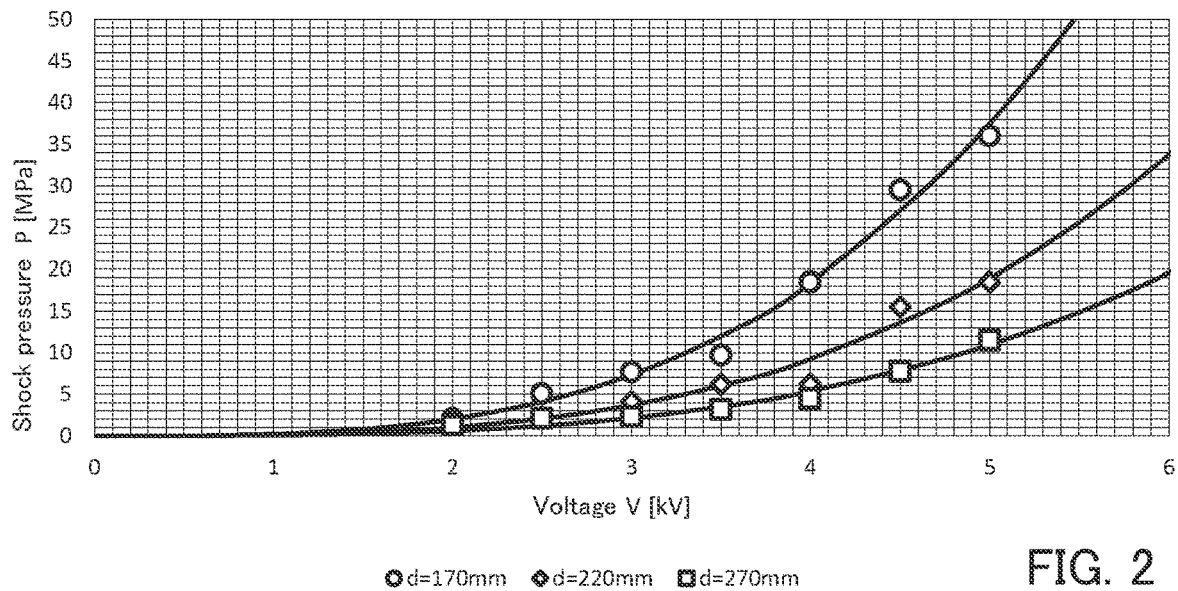
FIG. 2 is a graph showing the relationship between the distance from the shock wave generating unit and the charge voltage to the shock wave generating unit and the shock pressure in Examples of the present invention.

From the results shown in FIG. 2, it was found that the distance d [mm] from the shock wave generating unit 10, the charge voltage V [kV] to the shock wave generating unit 10, and the shock pressure P [MPa] have a relationship of the following equation (1).

$$P = 1.88 \times 10^5 \times d^{-2.66} \times V^{3.19} \tag{1}$$

[Sample Preparation]

Next, filters 1 to 3 shown in Table 1 were prepared as samples used for the evaluation of the cleaning performance by the filter cleaning method and the filter cleaning apparatus of the present invention. The filler adhered to (collected by) the filters 1 to 3 was titanium oxide.

TABLE 1

| Sample | Media ventilation resistance | Filler adhesion amount |
| --- | --- | --- |
| Filter 1 | 1974 Pa | Large |
| Filter 2 | 910 Pa | Small |
| Filter 3 | 793 Pa | Very small |

[Cleaning Performance Evaluation]

Next, as shown in FIG. 3, the cleaning performance was evaluated by setting the distance (d [mm]) between the shock wave generating unit 10 and the sample 20 to 500 mm in the filter housing (water tank filled with water) 12 and changing the charge voltage to the shock wave generating unit 10. In FIG. 3, the size of the water tank 12, the amount of water to be added to the water tank 12, and the configuration of the shock wave generating unit 10 are the same as those in FIG. 1. The cleaning performance was evaluated by comparing the measured turbidity of those obtained by collecting 10 mL of water contained in the sample 20 into a sample bottle when pulled out from the water tank 12 and the measured turbidity of those obtained by collecting 10 mL of the tap water filled in the water tank 12 into a sample bottle, using a digital turbidity meter "TU-2016" manufactured by FUSO. Evaluation was made five times for one condition (N=5). The results are shown in Table 2.

TABLE 2

| | | Treatment condition (d = 500 mm) | | Turbidity (NTU) | | | | | |
|---|---|---|---|---|---|---|---|---|---|
| | Sample | Voltage | Converted pressure | N = 1 | N = 2 | N = 3 | N = 4 | N = 5 | Average |
| Example 1 | Filter 1 | 2 kV | 0.11 MPa | 152 | 137 | 136 | 136 | 134 | 139 |
| Example 2 | Filter 2 | 1.75 kV | 0.07 MPa | 19.33 | 16.98 | 17.52 | 16.83 | 16.86 | 17.50 |
| Example 3 | Filter 3 | 2 kV | 0.11 MPa | 14.69 | 13.83 | 13.58 | 14.17 | 12.85 | 13.82 |
| Comparative Example 1 | Filter 2 | 1.5 kV | 0.05 MPa | 3.88 | 6.00 | 8.49 | 6.17 | 7.18 | 6.34 |
| Comparative Example 2 | Filter 3 | 1.6 kV | 0.06 MPa | 3.78 | 3.79 | 2.13 | 3.75 | 4.70 | 3.63 |
| Reference | Tap water | | | 0.15 | 0.06 | 0.00 | 0.30 | 0.73 | 0.25 |
| | Water contained in sample 20 before cleaning treatment | | | 6.51 | 3.14 | 4.10 | 4.22 | 4.38 | 4.47 |

As shown in Table 2, in each of Examples 1 to 3 in which the pressure applied to the filter by the shock wave was 0.07 MPa or more, the turbidity greatly exceeded that before the cleaning treatment, which showed that the filler was sufficiently removed. On the other hand, in each of Comparative Examples 1 and 2 in which the pressure applied to the filter by the shock wave was less than 0.07 MPa, the turbidity was not changed from that before the cleaning treatment, which showed that the removal of filler was insufficient. In addition, when the filters 1 to 3 were subjected to ultrasonic cleaning, removal of filler was not observed, which showed that the cleaning performance in each of Examples 1 to 3 was superior to that of ultrasonic cleaning.

INDUSTRIAL APPLICABILITY

As described above, the cleaning performance of the filter cleaning method and the filter cleaning apparatus of the present invention is superior to that of ultrasonic cleaning. The use of the filter cleaning method and the filter cleaning apparatus of the present invention is not particularly limited, and can be widely used for cleaning various filters.

While the present invention has been described above with reference to illustrative embodiments and examples, the present invention is by no means limited thereto. Various changes and variations that may become apparent to those skilled in the art may be made in the configuration and specifics of the present invention without departing from the scope of the present invention.

This application claims priority from Japanese Patent Application No. 2018-101606 filed on May 28, 2018. The entire subject matter of the Japanese Patent Applications is incorporated herein by reference.

REFERENCE SIGNS LIST

10: shock wave generating unit
11: pressure probe
12: filter housing (water tank)
13: oscilloscope
14: pulse power supply apparatus
20: filter (sample)

The invention claimed is:

1. A method for cleaning a filter, comprising: generating a shock wave; and bringing the shock wave into contact with a filter to which a filler adhered, wherein the shock wave is a wave of pressure change that travels at a speed exceeding the sonic speed, the shock wave is generated by pulse discharge using a pair of electrodes or by explosive detonation, in the shock wave contacting step, a pressure applied to the filter by the shock wave is 0.07 MPa or more, and wherein in the shock wave contacting step, the shock wave is brought into contact with the filter under water.

2. The method according to claim 1, wherein
the filler is at least one selected from the group consisting of titanium oxide, calcium carbonate, talc, silica, montmorillonite, sepiolite, clay, wollastonite, potassium titanate, zonotolite, gypsum fibers, aluminum borate, fibrous magnesium compounds, aramid fibers, carbon fibers, glass fibers, mica, glass flakes, polyoxybenzoyl whisker, zeolite, silver ion-supported zeolite, silica balloons, glass balloons, shirasu-balloons, resin balloons, carbon black, graphite, metal powder, metal fibers, metal foils, carbon nanotubes, ferrite, magnetic iron oxide, samarium cobalt, Nd—Fe—B, aluminum oxide, aluminum nitride, boron nitride, beryllium oxide, barium titanate, lead zirconate titanate, lead, tungsten, stainless steel, barium sulfate, molybdenum sulfide, charcoal powder, glass beads, magnesium oxide, hydrotalcite, antimony oxide, aluminum hydroxide, magnesium hydroxide, zinc borate, red phosphorus, zinc carbonate, dosonite, zinc oxide, iron oxide, calcium oxide, cerium oxide, activated clay, polymeric gel, pigments, polytetrafluoroethylene powder, and silica gel.

3. The method according to claim 1, wherein the explosive detonation generates the shock wave.

* * * * *